(12) United States Patent  (10) Patent No.: US 8,935,750 B2
Golovanov                  (45) Date of Patent:     Jan. 13, 2015

(54) SYSTEM AND METHOD FOR RESTRICTING PATHWAYS TO HARMFUL HOSTS IN COMPUTER NETWORKS

(75) Inventor: Sergey V. Golovanov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 337 days.

(21) Appl. No.: 13/251,289

(22) Filed: Oct. 3, 2011

(65) Prior Publication Data

US 2013/0086636 A1  Apr. 4, 2013

(51) Int. Cl.
  G06F 21/00    (2013.01)
  G06F 21/56    (2013.01)
  H04L 29/06    (2006.01)

(52) U.S. Cl.
  CPC .............. *G06F 21/56* (2013.01); *H04L 63/145* (2013.01); *H04L 63/1466* (2013.01); *H04L 63/1483* (2013.01)
  USPC .......... 726/3; 726/4; 726/22; 726/23; 705/52; 380/30

(58) Field of Classification Search
  USPC ...................... 713/154, 155; 726/3
  See application file for complete search history.

(56) References Cited

U.S. PATENT DOCUMENTS

| | | | |
|---|---|---|---|
| 7,111,325 B2 | 9/2006 | Keohane et al. | |
| 7,543,070 B1 * | 6/2009 | Watson et al. | 709/228 |
| 7,636,777 B1 | 12/2009 | Harada et al. | |
| 7,653,941 B2 | 1/2010 | Gleichauf | |
| 7,774,459 B2 | 8/2010 | Wang et al. | |
| 7,797,421 B1 * | 9/2010 | Scofield et al. | 709/224 |
| 7,873,993 B2 | 1/2011 | King | |
| 7,882,538 B1 * | 2/2011 | Palmer | 726/1 |
| 7,941,853 B2 | 5/2011 | Rozenberg et al. | |
| 7,958,555 B1 | 6/2011 | Chen et al. | |
| 8,010,469 B2 | 8/2011 | Kapoor et al. | |
| 2002/0112076 A1 * | 8/2002 | Rueda et al. | 709/245 |
| 2004/0019781 A1 * | 1/2004 | Chari et al. | 713/153 |
| 2005/0091538 A1 * | 4/2005 | Hoche et al. | 713/201 |
| 2006/0206615 A1 * | 9/2006 | Zheng et al. | 709/229 |
| 2007/0106786 A1 * | 5/2007 | Gleichauf | 709/224 |
| 2007/0153763 A1 | 7/2007 | Rampolla et al. | |
| 2007/0198603 A1 | 8/2007 | Tsioutsiouliklis et al. | |
| 2008/0008202 A1 * | 1/2008 | Terrell et al. | 370/401 |
| 2008/0022389 A1 * | 1/2008 | Calcev et al. | 726/14 |
| 2008/0089347 A1 | 4/2008 | Phillipi et al. | |
| 2008/0127338 A1 * | 5/2008 | Cho et al. | 726/22 |
| 2008/0229415 A1 | 9/2008 | Kapoor et al. | |
| 2008/0244744 A1 | 10/2008 | Thomas et al. | |
| 2008/0320152 A1 * | 12/2008 | Padmanabhan et al. | 709/228 |

(Continued)

FOREIGN PATENT DOCUMENTS

EP    1 782 572 B1    9/2007
WO    WO 2005112390 A1 *  11/2005

*Primary Examiner* — Morshed Mehedi

(74) *Attorney, Agent, or Firm* — Patterson Thuente Pedersen, P.A.

(57) ABSTRACT

System and methods for restricting accessibility to harmful content on a computer network. Network pathways are explored to study a plurality of investigated hosts from a plurality of diverse entry points into the computer network. The investigated hosts are checked whether they are malicious hosts believed to contain harmful content. For any of the investigated hosts that are malicious hosts, intermediary hosts having connectors to those malicious hosts are identified based on the exploring of the network pathways. An access restriction is associated with each of the intermediary hosts, which can be used to block or otherwise restrict access to the intermediary hosts, which may or may not themselves contain malicious content.

33 Claims, 11 Drawing Sheets

(56) References Cited

U.S. PATENT DOCUMENTS

| | | | |
|---|---|---|---|
| 2009/0097418 A1* | 4/2009 | Castillo et al. | 370/255 |
| 2009/0113547 A1* | 4/2009 | Higashikado | 726/23 |
| 2009/0287734 A1 | 11/2009 | Borders | |
| 2010/0100958 A1 | 4/2010 | Jeremiah | |
| 2010/0192024 A1* | 7/2010 | Middleton et al. | 714/48 |
| 2010/0235915 A1 | 9/2010 | Memon et al. | |
| 2010/0257592 A1* | 10/2010 | Wang et al. | 726/3 |
| 2010/0318800 A1* | 12/2010 | Simon et al. | 713/171 |
| 2011/0214187 A1 | 9/2011 | Wittenstein et al. | |
| 2011/0247045 A1 | 10/2011 | Rajagopal et al. | |
| 2013/0086636 A1 | 4/2013 | Golovanov | |

\* cited by examiner

SYSTEM AND METHOD FOR RESTRICTING PATHWAYS TO HARMFUL HOSTS IN COMPUTER NETWORKS

FIELD OF THE INVENTION

The invention relates generally to information processing and security and, more particularly, to arranging accessibility restrictions to provide protection against the spread of malicious software via a computer network.

BACKGROUND OF THE INVENTION

Today's computer antivirus industry is faced with constantly evolving opposition from producers of computer viruses and other such malware. New malware is developed to circumvent protection methods, techniques and systems for detection of malicious programs or hacking activity. Moreover, the protection mechanisms are themselves attacked in order to impede or block their protective functionality.

There have been reported incidents of hacking to compromise popular media content websites in order to distribute malware. For instance, an attacker who obtains access credential information (e.g., login, password) of an administrator of a media content website, or even simply those of a user having editing privileges of the website, could gain the ability to make repeated changes to the contents of that site. Such changes could place malicious content on a site frequented by visitors, or cause visitors to be unwittingly redirected to another website from which malware would be distributed to the visitors via file transfer or active content such as browser-executable code, a practice known as pharming. After a short time, e.g., a couple of hours, the attacker can restore the compromised website contents to their original state, thereby hiding his tracks. After the fact, it becomes impossible for security analysis to reproduce the attack vector.

The situation is further complicated by the fact that computer users often have antivirus or internet security software on their local machines which can automatically categorize the otherwise legitimate website as a phishing or other malicious or compromised host, and add the site's Internet address to a list of banned sites. Although such security software is quick to add an apparently malicious or compromised host to the banned site list, there are usually no means to remove the legitimate site once its usual functionality has been restored. Even if the site is manually excluded from the banned site list, it could automatically be placed on the list due to changes to the site's content made again by the attacker.

Therefore, it can be seen that protecting against hijacked websites poses the problem of dealing with a moving target. Conventional protection mechanisms that aim to block malicious sites tend to be both, under-inclusive, and over-inclusive in their ability to effectively protect users. Conventional protection is under-inclusive in that it tends to target malware-containing sites for blocking, the addresses and URLs of which can be rapidly changed, thereby resulting in lag time windows between exposure to malware and the start of the blocking of the malicious sites. At the same time, conventional protection is over-inclusive in that sites which are generally useful and which have been restored to their normal malware-free state will remain blocked, thereby depriving would-be visitors from accessing those sites.

At least for the above reasons, a solution is needed that provides practical protection against pharming and related malware spreading techniques over a network that overcomes some of the drawbacks suffered by conventional methods currently deployed.

SUMMARY OF THE INVENTION

One aspect of the invention is directed to an automated computer-implemented method for restricting accessibility to harmful content on a computer network that includes hosts and connectors between the hosts. The method is carried out by one or more systems of at least one computer running under program control. According to one method, network pathways are explored to study a plurality of investigated hosts from a plurality of diverse entry points into the computer network. The investigated hosts are checked to see if they are malicious hosts believed to contain harmful content. Whether these hosts are believed to contain harmful content can be determined by various approaches such as the hosts' reputations (e.g., as represented in existing blacklists, anti-phishing databases, or the like). Moreover, the presence of harmful content on the investigated hosts can be directly checked in the course of investigation.

For any of the investigated hosts that are malicious hosts, intermediary hosts having connectors to those malicious hosts are identified based on the exploring of the network pathways. An access restriction is associated with each of the intermediary hosts, which can be used to block or otherwise restrict access to the intermediary hosts, which may or may not themselves contain malicious content.

In certain embodiments, for each of the intermediary hosts, a measure of prevalence of its corresponding connectors to at least one of the malicious hosts is determined, and the restriction associated with each of the intermediary hosts is performed based on the measure of prevalence of the corresponding connectors. In a related embodiment, in response to the measure of prevalence of the corresponding connectors corresponding to a first intermediary host falling below a predefined value, the restriction associated with the first intermediary host is reduced.

In another aspect of the invention, a system for restricting accessibility to harmful content on a computer network comprises a data gathering system, an analysis module, and a security configuration module. The data gathering system includes a controllable execution environment module configured to explore network pathways to a plurality of investigated hosts from a plurality of diverse entry points into the computer network. The controllable execution environment module can be implemented in at least one virtual machine, in a sandbox on a user's computer system, in an internetwork device such as a router or firewall device, or in any combination thereof.

The system further includes an infection detector module configured to check if any of the investigated hosts are malicious hosts. The analysis module is configured to identify intermediary hosts having connectors to investigated hosts that are malicious hosts, and is further configured to associate an access restriction with each of the intermediary hosts. The security configuration module is configured to provide a host restriction set to a protection mechanism, the host restriction set being based on associations of the intermediary hosts with their corresponding access restrictions, such that the protection mechanism becomes configured to implement the access restrictions to restrict access to at least the intermediary hosts.

In various embodiments, the system can be arranged as a centralized portion and a distributed portion, where the distributed portion includes the data gathering system and the centralized portion includes the analysis module. The system can also include the protection mechanism itself as a part of a client side computer system or local network device.

In another aspect of the invention, a computer system that is configurable to restrict accessibility to harmful content on a computer network includes a protection mechanism configurable to implement access restrictions to restrict access by the computer system to certain hosts on the computer network based on a host restriction set. The protection mechanism is adapted to receive host restriction set updates from a security configuration provider that generates each host restriction set according to a process that includes: exploring network pathways to a plurality of investigated hosts from a plurality of diverse entry points into the computer network; checking for a presence of harmful content on the investigated hosts; for any of the investigated hosts that are malicious hosts determined to contain harmful content as a result of the checking, identifying intermediary hosts having connectors to those malicious hosts based on the exploring of the network pathways; associating an access restriction with each of the intermediary hosts; and generating the host restriction set based on associations of at least one access restriction with a plurality of intermediary hosts.

Aspects of the invention advantageously provide a practical solution for the problems outlined above, as well as addressing a number of other shortcomings of conventional approaches to dealing with pharming attacks and other techniques employed to disseminate malicious content on the Internet and other computer networks.

BRIEF DESCRIPTION OF THE DRAWINGS

The invention may be more completely understood in consideration of the following detailed description of various embodiments of the invention in connection with the accompanying drawings, in which.

Figure 1:
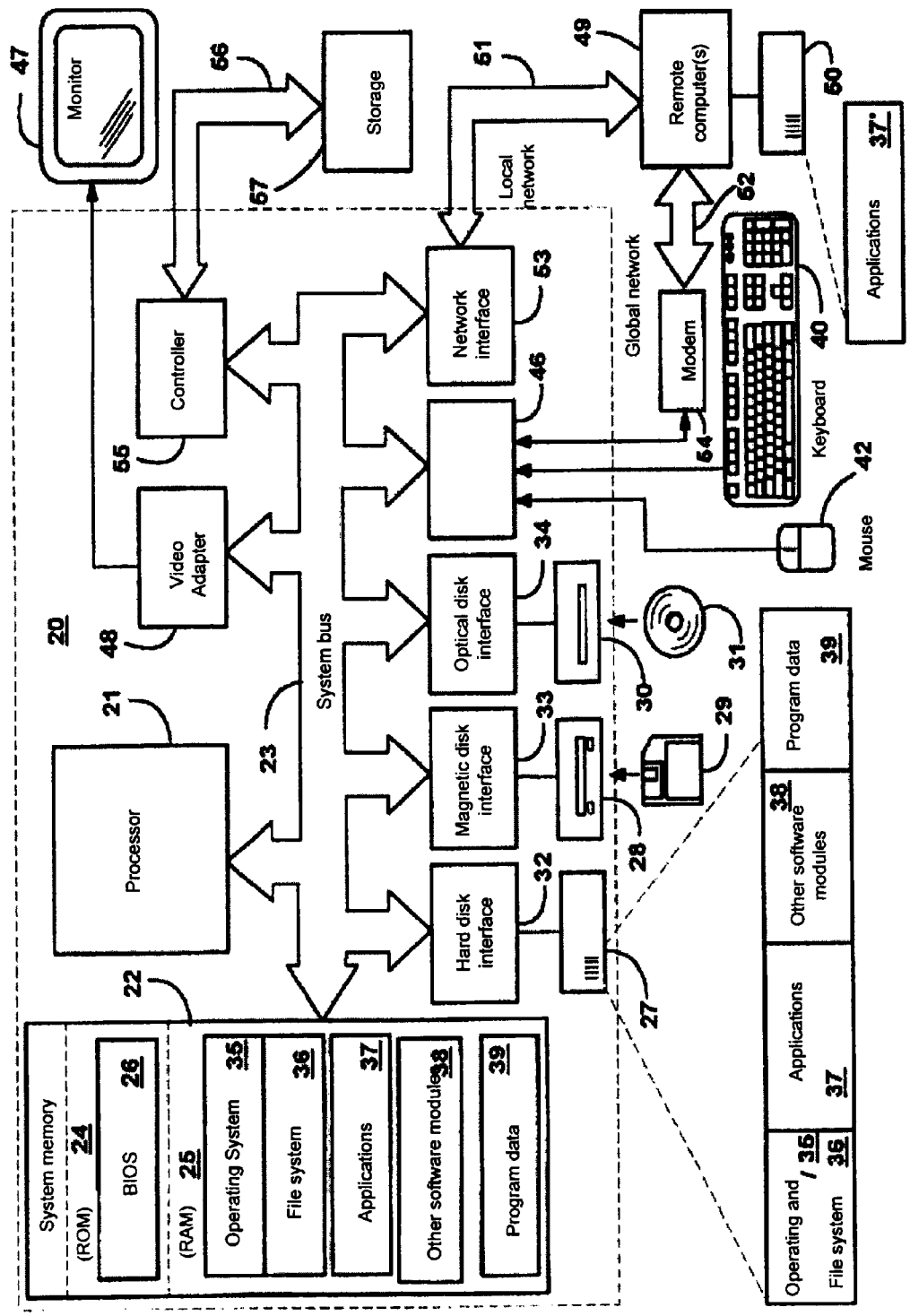
FIG. 1 is a block diagram illustrating an exemplary general-purpose computer system on which one or more functional modules according to embodiments of the invention can be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention are directed to identifying intermediary hosts in a computer network, such as websites on the World Wide Web, for example, through which malicious software is spread. As used herein, the term host refers to an addressable device on the network, such as an endpoint host (e.g., server, client PC, etc.) or an intermediary device such as a router or other computing device that is identifiable by an assigned address and may be situated along a communication path between an entry point to the network and a malicious host. Although routing devices may sometimes be referred to simply nodes, the for the sake of simplicity and consistency, the term host shall be used herein to refer to both types of network devices. In addition, although the embodiments below refer to the Internet and World Wide Web as an exemplary network, it should be understood that principles of the invention are applicable more generally in the networking field, unless expressly limited in a claim.

One approach taken according to embodiments of the invention, which can reveal the attacker's infrastructure, is achieved through the study of relationships, or connectors, between hosts in the network, and automated analysis of the prevalence of the connectors between the hosts.

In one embodiment, baseline data representing the network hosts and connections therebetween is collected. The collection of the baseline data is conducted such that the study of pathways in the network is diversified. The diversification in this approach is achieved by using diverse entry points to the network by a data gathering system with access to the network from different entry points (e.g., World Wide Web access via different Internet service providers in different countries or different parts of the world, or from different subnets of the Web, or any combination thereof). This diversification approach facilitates exploration of multiple different possible pathways to the same network hosts under investigation. Since the routing information in a network is dynamic, one approach is to have a portion of the data gathering system operating from the perspective of each of the major subnets that are connected to the Internet.

In some embodiments, the data gathering system for collecting the baseline information for network analysis can performed by a controllable execution environment. The controllable execution environment can be implemented as a virtual machine (similar to a system of virtual lures, as disclosed, for example, in U.S. Pat. No. 7,774,459, which is incorporated by reference herein), in a sandbox module running on a one or more computer systems, in an internetwork device such as a router or firewall device, or in any combination thereof, that accomplishes the function of gathering information on the actions performed by network exploration applications on at least one computer system.

For the sake of brevity, embodiments hereinbelow are described in the context of a virtual machine implementation; however, it will be understood that any suitable controllable execution environment can be utilized according to various embodiments of the invention.

These mechanisms are able to detect malicious software and have full control over the traffic, which allows gathering additional information about the source of the spread of unwanted or malicious software, for example, recording traffic routes to a malicious or compromised host, or finding information about the host's registered domain name. The data is collected for analysis at a central server in the form of a table that contains at least the domain name of the host; IP addresses corresponding to the domain name of the host; it IP address associated with domain name, and its traffic routing information.

The data collected about the network hosts are used to build a one or more models, referred to herein as graphs, of relationships between hosts. In one type of embodiment, graphs can include information representing the topology of explored portions of the network, determinations of which hosts in the network have malicious content, and which of the pathways have the most prevalent association with the malicious host(s).

In one approach, the graphs are analyzed using heuristic algorithms, for example, to identify commonly-used pathways of communication between network hosts. The intermediary hosts situated (in a networking sense) along a pathway that leads to a malicious or compromised host are identified. Based on the constructed graphs, certain intermediary hosts associated with hosts that have malicious content are automatically restricted or blocked outright. These restricted or blocked intermediary hosts may or may not actually have any malicious content. Thus, in cases where the restricted or blocked intermediary hosts are free of malicious content, this approach results in blocking or restricting access to non-malicious hosts.

In one type of implementation, the degree, or prevalence, of association between a given intermediate host and target host determined to have malicious content is taken into account when determining whether to block or restrict that intermediate host. In a related embodiment, if, over time, the prevalence of the connector to a malicious or compromised host is decreased (e.g., compared to a threshold value), the system automatically restores access to the host which is now weakly associated with the malicious activity.

In a practical realization, the system and method of the invention are implemented, and carried out, respectively, using computer machinery. The computer-implemented system can be implemented in one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

FIG. 1 is a block diagram illustrating an exemplary general-purpose computer system on which one or more functional modules of the system can be implemented. Personal computer or server 20 contains a CPU 21, system memory 22 and system bus 23, which contains various system components, including memory associated with CPU 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input/output system (BIOS), containing the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM, DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, Mouse 42). Other input devices may be (not shown): microphone, joystick, game console, satellite dish, scanner, etc. Such an input device are usually connected to the CPU 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

Personal computer 20 generally operates in a networked environment, using a logical connection to one or more remote computers 49. A remote computer (or computers) 49 is/are the same as personal computers, servers, routers, network stations, peering devices or another network host, and usually, have most or all of the elements previously described in the description of the substance of a personal computer 20, shown in FIG. 1, but only as a storage device 50 with applications 37. Logical connections include a local area network (LAN) 51 and wide area network (WAN) 52, such networks are common office equipment, and are also used in corporate computer networks, company intranets and the Internet.

When using LAN networks, a personal computer 20 is connected to LAN 51 via a network adapter or interface 53. When using the WAN networking, personal computer 20 has a modem 54 or other means of communication with the global computer network 52, such as the Internet. A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

Figure 2:
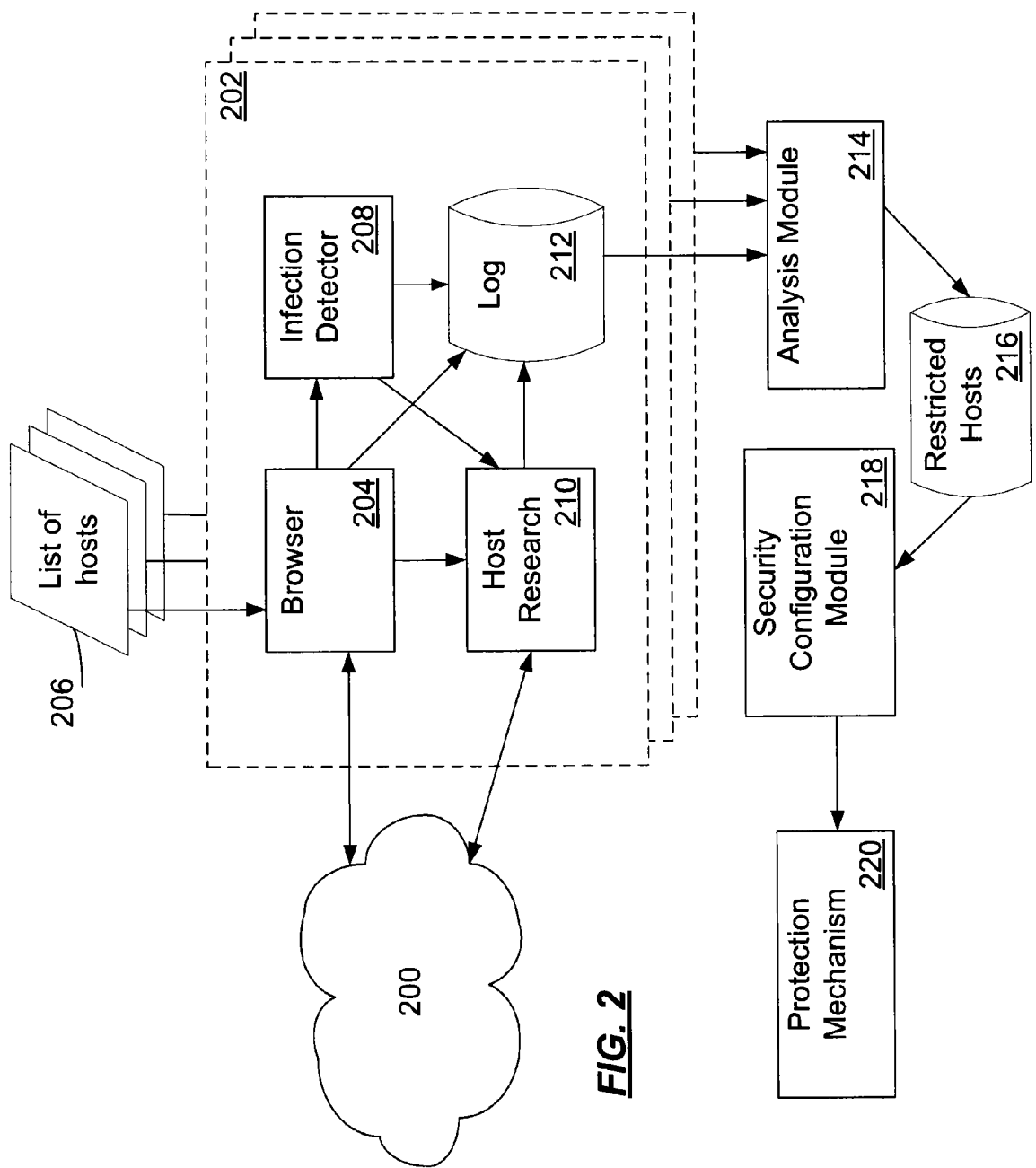
FIG. 2 is a block diagram illustrating functional modules of a system for analyzing a network and protecting a client from accessing malicious content on the network according to one embodiment.

FIG. 2 is a block diagram illustrating functional modules of a system for analyzing a network 200 and protecting a client from accessing malicious content on the network according to one embodiment. In this embodiment, the data gathering system is implemented as a plurality of virtual machines 202 are utilized to gather information about the network topology and sources of malware distribution. Each virtual machine 202 implements or emulates an operating system (or at least portions thereof), and institutes specialized modules for performing certain functions as will be described below.

The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

Thus, each virtual machine, configured to execute on a general-purpose computer or server, and being configured for specific functionality constitutes a number of modules, It is also contemplated that, in various embodiments, virtual machines 202 are implemented on multiple different physical computer systems, which may or may not be geographically distributed. Other embodiments are contemplated in which virtual machines 202 are implemented on a single computer system or server. Still other embodiments are contemplated in which separate individual computer systems are utilized in lieu of virtual machines. However, for the sake of brevity, the following embodiments shall be described in the context of the virtual machine embodiments.

Each virtual machine 202 is configured to operate automatically, i.e., under program control. Virtual machines 202 are each configured such that, in operation, each virtual machine 202 receives a list 206 of initial hosts to be investigated, such as a set of IP addresses or URLs, to browse. List 206 of initial hosts includes hosts which may either be suspected of having malware, or hosts suspected of leading to sites containing malware. Hosts that are investigated by virtual machines 202 include initial hosts, as well as hosts along pathways to the initial hosts, and hosts along pathways branching from the initial hosts.

List 206 of initial hosts 206 for investigation can be obtained, for example, based on the most frequently-visited pages on the Internet according to statistics relating to web searches. These statistics can be compiled for a large plurality of users, for defined groups of users (e.g., employees of a company or department thereof), or for specific individual users for whose benefit the protection system is operating.

Using browser module 204, each of the virtual machines 202 sequentially explores (e.g., loads or browses) all the hosts that are listed in its corresponding list 206. In a related embodiment, each browser 204 explores all of the links listed on the loaded web pages to a specified depth of nesting, for example, up to 5 links. The investigation is tracked, with the actions taken in the course of exploring the hosts on the network recorded in exploration tracking log 212 for each virtual machine.

In one related type of embodiment, virtual machines 202 are configured to employ technologies such as VPN, PPTP, IPSec, L2TP and the like to vary their entry point to the network, and explore the route of access to the researched host from another provider, from another country, or from another region of the world. Such an approach facilitates automatically detecting threats targeted to particular groups of users.

Each virtual machine 202 is configured to detect malware in the course of the exploration of the initial hosts and of other explored hosts arrived at in the course of exploration that started at the initial hosts. In each virtual machine 202, infection detector module 208 maintains a virtual system disk, a virtual system registry and a virtual system memory. After having browser 204 run for a while, e.g., 5-10 minutes, infection detector module 208 takes a snapshot of the virtual system disk, virtual system registry and virtual system memory. The virtual system disk, a virtual system registry and a virtual system memory are then restored to their initial state and the same process is repeated with the next URL address for the exploration. Snapshots of the virtual system disk, system registry and memory are compared by infection detector module 208 with their the initial state. If any of the URLs being examined contains malicious software, then the virtual machine 202, not having the critical security provisions, will obtain a new executable program, program modules, or changes to a branch of the registry, for example. If infection detector 208 does not detect unexpected and unwanted new files or changes to the registry after the exploration of the given host, the host can be considered safe.

In one approach, the operating systems and software of the virtual machines 202 do not contain security provisions that prevent malware infection and are therefore susceptible such infection. In another approach, the virtual machines 202 are configured with certain security provisions, such that infection of these virtual machines requires an infection vector that works around the security provisions which are present. This latter approach focuses the network host blocking on only those pathways which distribute more virulent forms of malware.

In a related embodiment, the use of several virtual machines configured with successively stronger levels of security, a system can obtain a measure of virulence of a particular piece of malware. In this approach, the strength or quality of protection against infection present on a virtual machine 202 that has become infected as a result of accessing a certain host is associated with that host in log 212.

As the exploration proceeds, a record of the results of the URL exploration is compiled in log 212, which contains URLs or IP addresses of intermediary hosts along pathways to the explored hosts, URLs or IP address of the links and other references from the explored hosts, as well as the URL addresses of the explored hosts themselves. Host research module 210 obtains additional information about suspicious hosts. Table 1 below illustrates an example of such a record. In this example embodiment, each table entry contains at least the following fields: the domain name of the host in the network, an indication of the content of malicious software (i.e., the detected presence on of unwanted files or unwanted changes in the registry of the virtual machine); the IP address corresponding to a specific domain name obtained by using a search of the name server, e-mail address of the domain owners, according to records in the registry of domains, and IP-addresses of intermediary hosts along the network data route to the host of the URL. In various embodiments, the above information is collected either directly by host research module 210 or by separate individual research modules (not necessarily integral to the virtual machines 202) using publicly accessible services.

In example embodiments, host research module 210 accesses information on a name server using, for example, the utility nslookup (English language name server lookup search on the name server-based utility that provides a user command line interface to access the system, DNS). In a related embodiment, the e-mail addresses of the domain owner(s) is looked up by host research module 210 using the WHOIS service—a network application layer protocol based on TCP (port 43), used for registration information for the owners of domain names, IP addresses and autonomous systems. IP addresses of intermediary hosts or hosts along the route of data across the network to the host of the URL are found using the utilities tracert or traceroute.

Figure 3A:
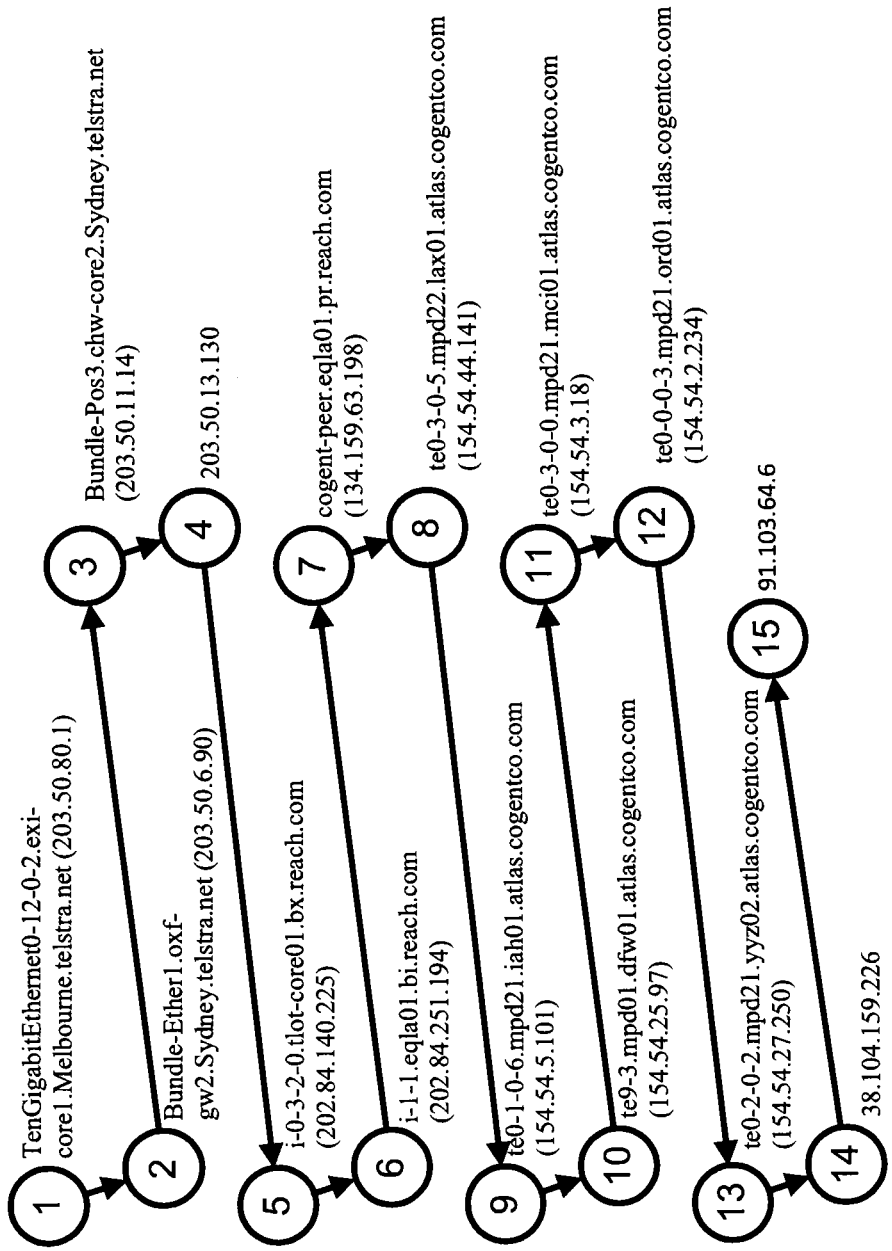
FIGS. 3A and 3B illustrate examples of building pathways for data transfer from two different entry points to the Internet to the website kaspersky.com according to embodiments of the invention, with FIG. 3A representing a pathway having an entry point from Australia via telstra.net, and FIG. 3B representing a pathway having an entry point in Italy via sysnet.it.

Traceroute is a computer utility designed to determine the routes of data using the TCP/IP protocol suite. Traceroute is based on the ICMP protocol. The program performs a route trace and by sending data to a specified network host and displaying information about all of the intermediate routing points through which the data passes to the target host. In case of problems when delivering data to a host, the program allows one to determine exactly in what part of the network the problems arose. Table 2 illustrates an exemplary result of tracing a route from Australia to the www.kaspersky.com site. FIG. 3A illustrates this pathway graphically.

TABLE 2

Results of tracing a route from Australia (via the Telstra.net site) to the destination www.kaspersky.com at 91.103.64.6

| Hop No | http://www.telstra.net/cgi-bin/trace?91.103.64.6<br>Tracing route to kaspersky.com [91.103.64.6]<br>over a maximum of 30 hops: |
|---|---|
| 1 | TenGigabitEthernet0-12-0-2.exi-core1.Melbourne.telstra.net (203.50.80.1) 4 msec 0 msec 4 msec |
| 2 | Bundle-Pos3.chw-core2.Sydney.telstra.net (203.50.11.14) 16 msec 16 msec 16 msec |
| 3 | Bundle-Ether1.oxf-gw2.Sydney.telstra.net (203.50.6.90) 16 msec 16 msec 16 msec |
| 4 | 203.50.13.130 16 msec 16 msec 16 msec |
| 5 | i-0-3-2-0.tlot-core01.bx.reach.com (202.84.140.225) [AS 4637] 244 msec 248 msec 248 msec |
| 6 | i-1-1.eqla01.bi.reach.com (202.84.251.194) [AS 4637] 308 msec 312 msec 308 msec |
| 7 | cogent-peer.eqla01.pr.reach.com (134.159.63.198) [AS 4637] 204 msec 204 msec 216 msec |
| 8 | te0-3-0-5.mpd22.lax01.atlas.cogentco.com (154.54.44.141) 248 msec |
| 9 | te0-1-0-6.mpd21.iah01.atlas.cogentco.com (154.54.5.101) 240 msec |
| 10 | te9-3.mpd01.dfw01.atlas.cogentco.com (154.54.25.97) 344 msec |
| 11 | te0-3-0-0.mpd21.mci01.atlas.cogentco.com (154.54.3.18) 256 msec |
| 12 | te0-0-0-3.mpd21.ord01.atlas.cogentco.com (154.54.2.234) 376 msec |
| 13 | te0-2-0-2.mpd21.yyz02.atlas.cogentco.com (154.54.27.250) 376 msec |
| 14 | 38.104.159.226 396 msec 392 msec 384 msec |
| 15 | 91.103.64.6 128 msec 133 msec 130 msec |

TABLE 1

Example of URL exploration results

| N | Domain Name | Malware? | IP addresses | Owner's Email | Traceroute |
|---|---|---|---|---|---|
| 1 | Kaspersky.com | N | 91.103.64.139, 91.103.64.90, 91.103.64.138, 91.103.64.6, 91.103.64.140 | ripencc@kaspersky.com | 212.102.36.3, 151.11.91.1, 151.5.150.5, 151.6.65.194, 151.6.7.233, 151.6.1.118, 151.6.1.210, 149.6.152.205, 130.117.3.17, 130.117.0.193, 130.117.2.41, 154.54.37.82, 154.54.28.93, 154.54.7.213, 38.104.159.226, 38.117.98.208 |
| 2 | ... | ... | ... | ... | ... |

Figure 3B:
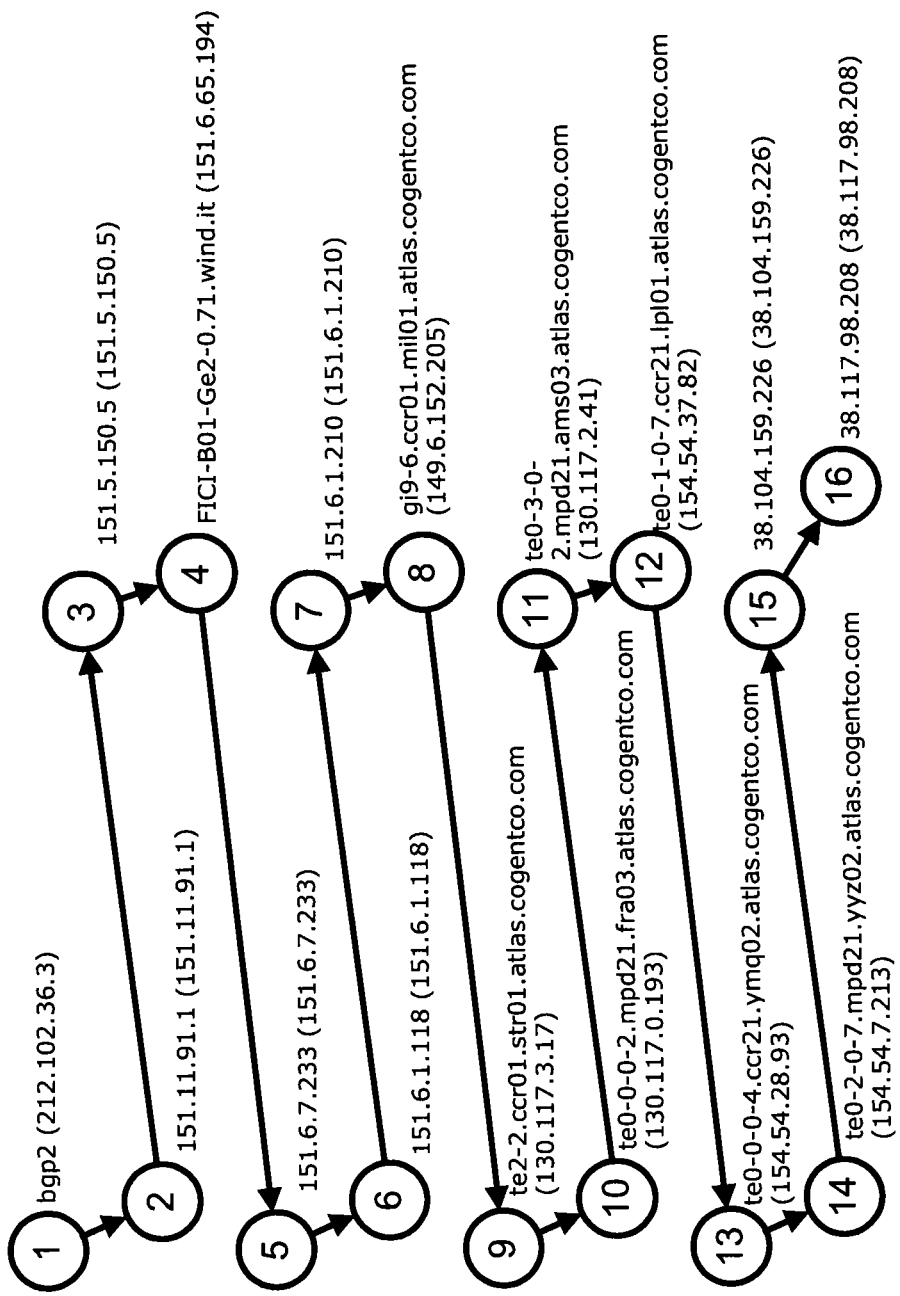

Table 3 below presents a listing of the intermediary hosts from the sysnet.it site to the www.kaspersky.com site have successfully responded to the request. At hop 16, a reply is received from a host with the IP-address of 38.117.98.208, which ensures the site's operation for the European direction. FIG. 3B illustrates this pathway graphically.

TABLE 3

Results of tracing the route from the Italy (via the sysnet.it site) to the destination site www.kaspersky.com at 38.117.98.208

| Hop No | Traceroute per kaspersky.com: trcsys to kaspersky.com (38.117.98.208), 30 hops max, 40 byte packets |
|---|---|
| 1 | bgp2 (212.102.36.3) 0.207 ms 0.176 ms 0.238 ms |
| 2 | 151.11.91.1 (151.11.91.1) 0.904 ms 0.933 ms 0.917 ms |
| 3 | 151.5.150.5 (151.5.150.5) 9.177 ms 9.161 ms 9.172 ms |
| 4 | FICI-B01-Ge2-0.71.wind.it (151.6.65.194) 10.429 ms 9.262 ms 13.041 ms |
| 5 | 151.6.7.233 (151.6.7.233) 18.927 ms 18.922 ms 20.231 ms |
| 6 | 151.6.1.118 (151.6.1.118) 32.155 ms 24.905 ms 28.050 ms |
| 7 | 151.6.1.210 (151.6.1.210) 45.889 ms 28.482 ms 43.160 ms |
| 8 | gi9-6.ccr01.mil01.atlas.cogentco.com (149.6.152.205) 40.991 ms 42.597 ms 45.717 ms |
| 9 | te2-2.ccr01.str01.atlas.cogentco.com (130.117.3.17) 33.623 ms 34.743 ms 31.874 ms |
| 10 | te0-0-0-2.mpd21.fra03.atlas.cogentco.com (130.117.0.193) 36.494 ms 36.307 ms 36.742 ms |
| 11 | te0-3-0-2.mpd21.ams03.atlas.cogentco.com (130.117.2.41) 47.372 ms 69.952 ms 83.358 ms |
| 12 | te0-1-0-7.ccr21.lpl01.atlas.cogentco.com (154.54.37.82) 141.664 ms 56.299 ms 56.711 ms |
| 13 | te0-0-0-4.ccr21.ymq02.atlas.cogentco.com (154.54.28.93) 124.991 ms 123.853 ms 123.844 ms |
| 14 | te0-2-0-7.mpd21.yyz02.atlas.cogentco.com (154.54.7.213) 132.376 ms 129.581 ms 131.348 ms |
| 15 | 38.104.159.226 (38.104.159.226) 148.488 ms 147.103 ms 147.491 ms |
| 16 | 38.117.98.208 (38.117.98.208) 132.555 ms 130.087 ms 130.849 ms |

In another example embodiment, URL research results are obtained through the use of specialized agents on users' computer systems (or on a service provider's computer systems), which are used as a controlled execution environment; such agents perform a preliminary check of network hosts. In this example, information on malicious pages, the domain name and the network host IP address containing malicious software are sent to the URL research results table stored on a central server. Any missing information required to fill out the URL research results table is gathered by a central server or a computing cloud, similarly to the above-described process.

In one approach, the information on the detected malicious pages is gathered using a firewall. In this case, information on malicious pages, the domain name and the network host IP address containing malicious software are sent to the URL research results table stored on the central server. Any missing information required to fill out the URL research results table is gathered by a central server or a computing cloud, similarly to the above-described process. If necessary, the network's system administrator can increase the security level, if he enables a firewall mode for collecting all information, including the use of WHOIS, nslookup, traceroute services. The information gathered in this manner for the URL research results table will be more consistent with the actual network topology.

Table 4 below contains an example of the registration information for the www.kaspersky.com domain name's owner, as per the WHOIS database.

TABLE 4

Example WHOIS Registration information

```
% This is the RIPE Database query service.
% The objects are in RPSL format.
%
% The RIPE Database is subject to Terms and Conditions.
% See http://www.ripe.net/db/support/db-terms-conditions.pdf
% Note: this output has been filtered.
%    To receive output for a database update, use the "-B" flag.
% Information related to '91.103.64.0 - 91.103.67.255'
inetnum:              91.103.64.0 - 91.103.67.255
netname:              KL-NET
descr:                Kaspersky Lab Internet
country:              RU
org:                  ORG-KL28-RIPE
admin-c:              KLCR1-RIPE
tech-c:               KLCR1-RIPE
status:               ASSIGNED PA
mnt-by:               KL-MNT
source:               RIPE # Filtered
organisation:         ORG-KL28-RIPE
org-name:             Kaspersky Lab ZAO
org-type:             LIR
address:              Kaspersky Lab ZAO
                      Alexey Shabalin
                      1ST VOLOKOLAMSKY PROEZD 10/1
                      123060 MOSCOW
                      RUSSIAN FEDERATION
phone:                +7 495 7978700
fax-no:               +7 495 7978700
e-mail:               ripencc@kaspersky.com
admin-c:              AVS140-RIPE
admin-c:              KLCR1-RIPE
mnt-ref:              RIPE-NCC-HM-MNT
mnt-ref:              KL-MNT
mnt-by:               RIPE-NCC-HM-MNT
source:               RIPE # Filtered
role:                 Kaspersky Lab Contact Role
address:              1st Volokolamsky Proezd 10/1
address:              123060
address:              Moscow
address:              RU - Russian Federation
e-mail:               ripencc@kaspersky.com
admin-c:              AVS140-RIPE
tech-c:               AVS140-RIPE
nic-hdl:              KLCR1-RIPE
mnt-by:               KL-MNT
source:               RIPE # Filtered
% Information related to '91.103.64.0/21AS41983'
route:                91.103.64.0/21
descr:                Kaspersky Lab ZAO
origin:               AS41983
mnt-by:               KL-MNT
source:               RIPE # Filtered
```

In the appropriate field the e-mail address ripencc@kaspersky.com is indicated. The original purpose behind the WHOIS service was to allow system administrators to find contact information for other administrators of IP-addresses or domain names. There are centralized and distributed databases with WHOIS-interface. In the first case a WHOIS server contains the complete database and responds to requests for all registrars. This type of WHOIS server for the top-level domains .org and .ru is built according to this scheme. In the second case, the central WHOIS server does not contain a complete database and only redirects the user to the WHOIS server for the appropriate registrar. This scheme works for WHOIS for the .com domains. When a WHOIS client knows how to recognize such a redirection, it addresses the correct peripheral WHOIS server; otherwise the user has to query the appropriate server manually. The protocol of WHOIS does not provide any distinction between the centralized and distributed models. Concrete implementation of the repository of records depends on the registrar. Some top-level domains including .com and .net, use a distributed architecture that gives registrars the ability to include arbitrary information in the records of their customers. Other domain registries, for example .org, store the data centrally.

In one embodiment, the WHOIS research is analyzed to detect relationships of commonly-owned hosts. For instance, if a host determined to be malicious is associated in a WHOIS database with an email address and other owner data, which is also associated with other hosts in the WHOIS database, those other hosts are added to an initial host list for investigation.

Figure 5:
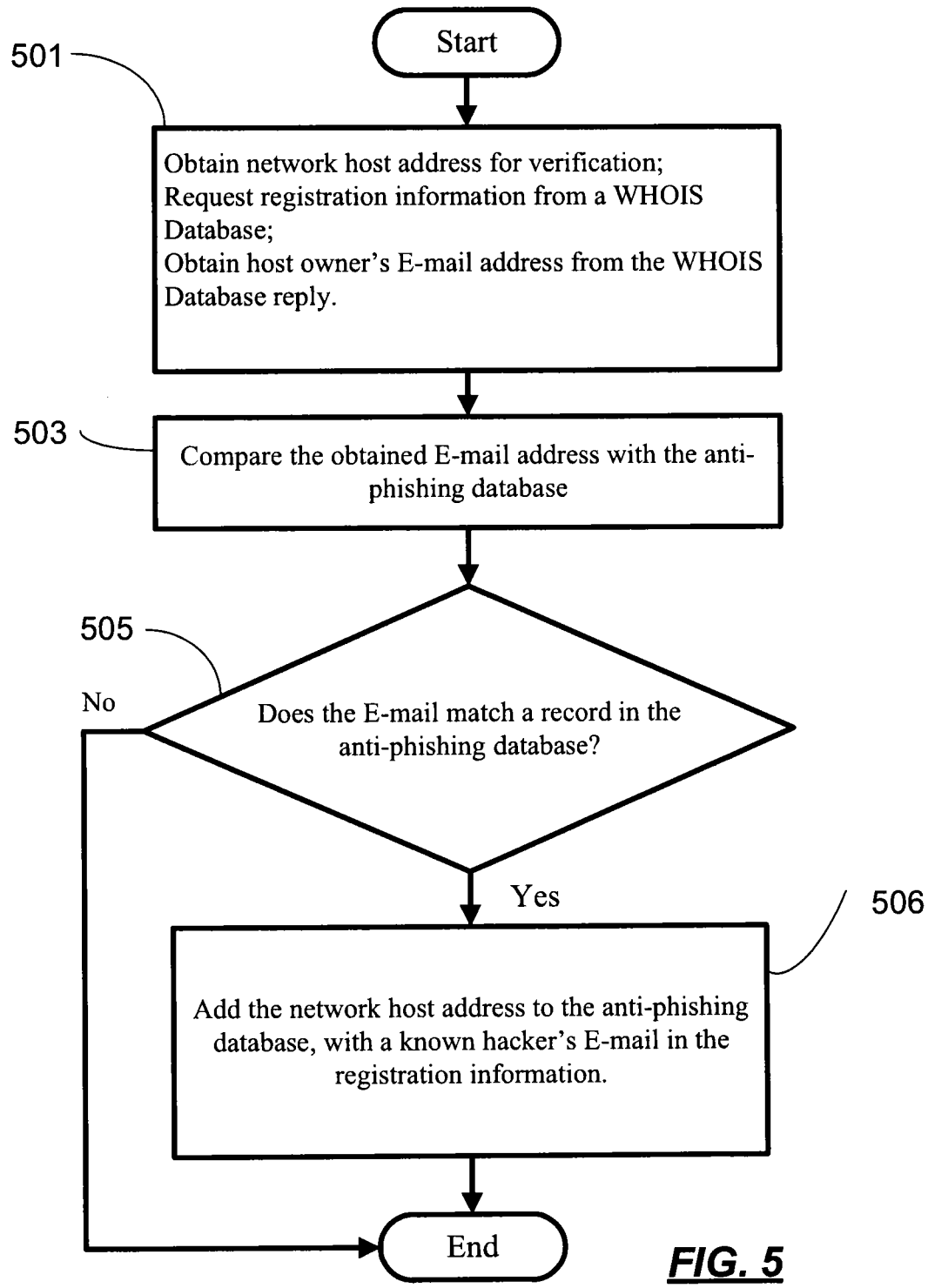
FIG. 5 illustrates an exemplary sequence of executing a method according to one embodiment in which a check is made whether a network host belongs to a hacker using registration information in the domain record.

FIG. 5 is a process flow diagram illustrating an example method of analyzing URL registration information according to one embodiment. The registration information received using a WHOIS server and saved in the URL research results table contains a reference to the domain owner's e-mail address. Since the e-mail address is used by the owner for correspondence with the provider and for controlling the host on the network or a group of hosts on the network, such e-mail address can be a sign of a hacker and can be used to detect domains controlled by the hacker. At the initial stage of the research, upon generating a graph of followed links and automatic redirection, it is appropriate to check whether the owner's e-mail address is present in the anti-phishing database.

In FIG. 5, beginning at 501, the network node address for verification is obtained, and a request for registration information from a WHOIS Database is sent. The host's owner's e-mail address is received in the WHOIS database's reply. At 503, the obtained e-mail address is compared with contents of an anti-phishing database. At decision 505, if the result of the comparison is affirmative, the process branches to 506, where the host's address is added to the anti-phishing database. Otherwise, the process ends.

Accordingly, research of malicious host data can be used to proactively find other malicious hosts, and to uncover patterns of malware dissemination being employed. These patterns, in turn, are used to focus exploration and, ultimately, protection, onto a specific segment of the network being exploited.

Figure 6:
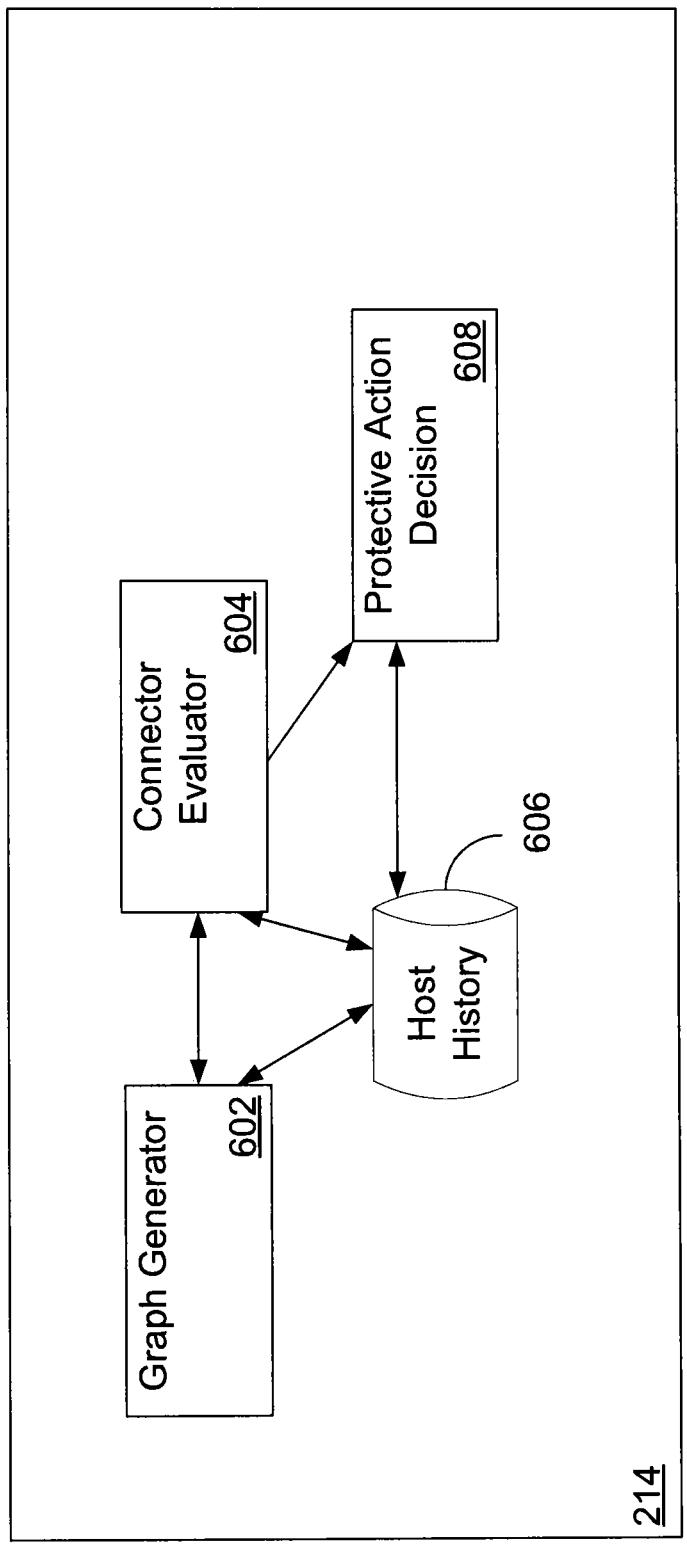
FIG. 6 is a block diagram illustrating one exemplary embodiment of an analysis module depicted more generally in FIG. 2.

The resulting table of URL exploration results stored in log 212 is read by analysis module 214. One exemplary embodiment of analysis module 214 is illustrated in as a block diagram in FIG. 6. Graph generator module 602 is adapted to generate graphs of inter-host communication on the network. In one approach graph generator module 602 builds a graph using the data from the URL exploration results, based on one or more of the following principles for determining the prevalence of connectors between the hosts.

In one embodiment, the construction of the graph reflects the actual topology of information channels between network hosts and is constructed in accordance with actual routes across the network. The hosts on the graph contain IP addresses of intermediary hosts along the route of data across the network to the site at the specified URL, obtained through the use of tools such as tracert or traceroute.

Connector evaluator module 604 analyzes the connectors between the hosts, which indicate that there is an association (i.e., working relationship) between the hosts, and further represent a measure of the prevalence of each connection. In various embodiments, connectors represent any one of, or any combination of, a communication channel, a tunnel, links, redirects, and the like. The prevalence of the connectors can be determined by connector evaluator module 604 based at least in part on the frequency of use of this connector to transmit information or otherwise facilitate browsing to arrive at a source of malicious software. In one particular embodiment, the frequency of use of a given connector represents how much, or how often, this connector plays a role in accessing malicious websites. Prevalence of the connection can be represented by the relative degree, e.g., as a percentage, or absolute measure, such as number of connections established, in the use of this connector for access to a malicious or compromised host.

Figure 7:
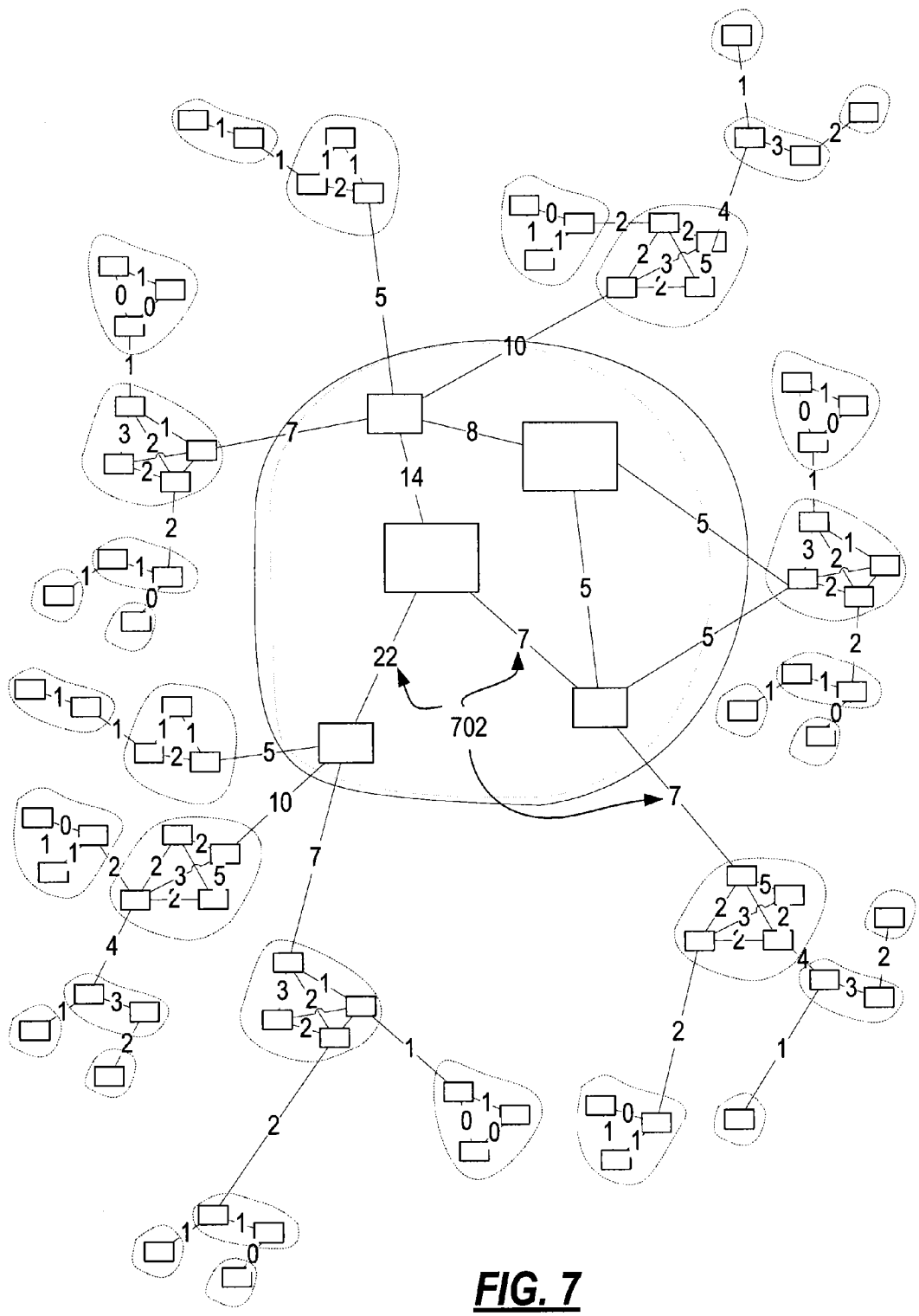
FIG. 7 is an exemplary a visual example of a graph according to one embodiment which is in the form of a network map.

For illustration purposes, a visual example of such a graph according to one embodiment is in the form of a network map, as depicted in FIG. 7. According to one exemplary visual representation, the prevalence of each connector can be indicated. In FIG. 7, for instance, a numerical indicator, such as the one indicated with reference numeral 702, represents the prevalence of each connector. In this particular example, each of the numerical indicators 702 represents the number of recorded instances when the corresponding connector was used to access a malicious host.

In practice, non-visual representations of the graph are utilized according to various embodiments. A variety of different data structures can be used to store a representation of the graph in a computer-readable storage medium such as a memory device or disk. For instance: network tree structures, an adjacency list or matrix, or an incidence list or matrix, or any combination thereof. Any one (or more) of a variety of suitable data structures, either currently known or later developed, are contemplated as being within the spirit of the invention.

In a related embodiment, links and re-directs which are found on the web sites of interest are taken into account in forming the graph of relationships between hosts. Typically, a Web page contains many links. Some of these links lead to the same resource on the same server. Other links may lead to affiliate sites or other organizations, such as in the case of a banner exchange network. Since the depth of exploration of the list of URL addresses for virtual machines may be limited, for example, not to exceed some preset value, these limits are applied to redirects as well as to links.

Figure 8:
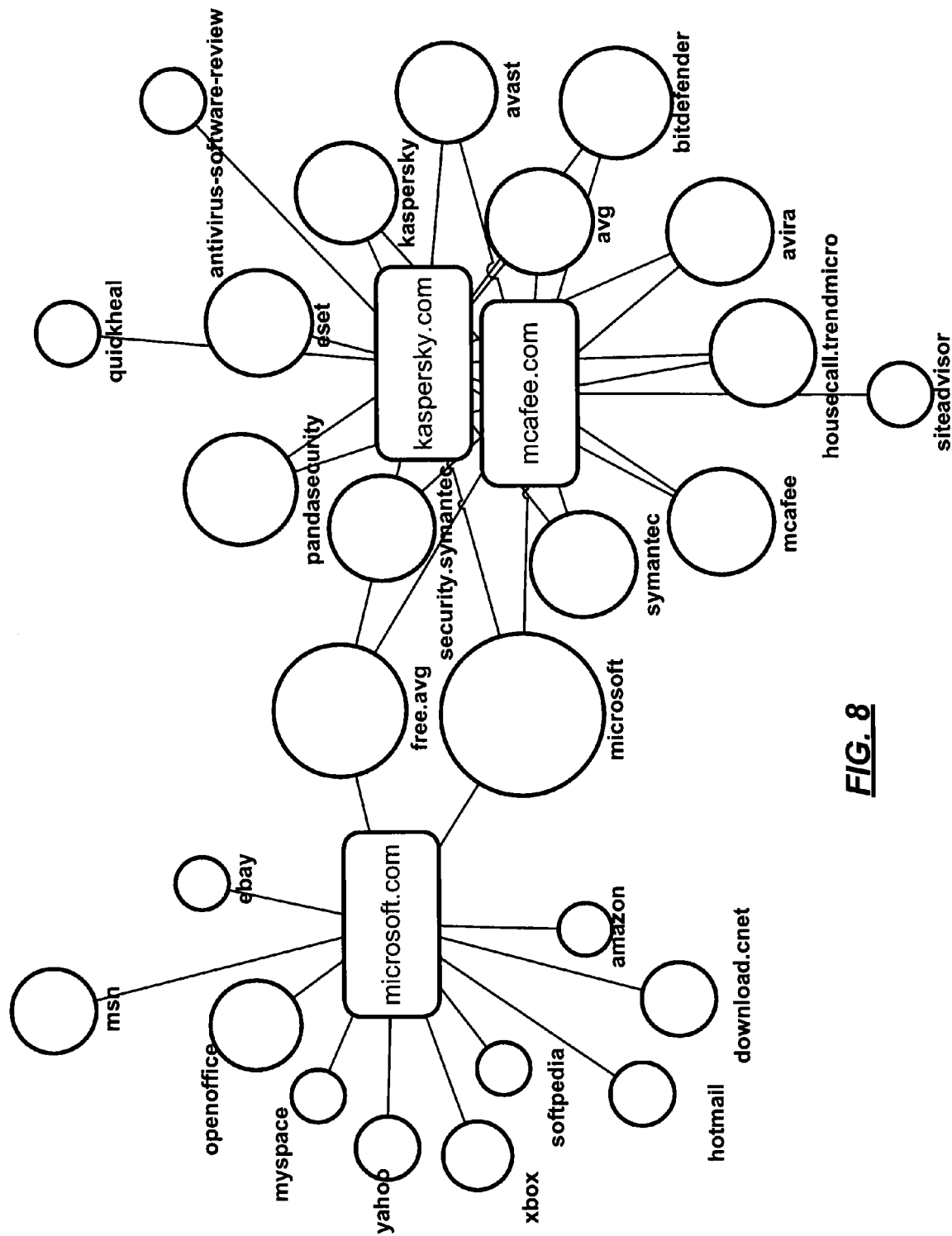
FIG. 8 is a diagram showing a visual depiction of a graph of links and automatic redirects between hosts according to one embodiment.

In one embodiment, a graph of links and automatic redirects between hosts is formed for each site in the list of URLs. FIG. 8 is a diagram showing a visual depiction of such a graph. For hosts on this graph, which represent particular Web sites in this example, the browser's surfing from one site to another is represented by a line between the hosts of the graph corresponding to those sites.

Host history module 606 stores relevant information about each suspected host and, using the output of connector evaluator module 604, represents a measure of regularity of use of a particular intermediary host to access the malicious or compromised host. If, based on an analysis of the graph and on analysis of the host history, it is determined that there are occurrences in which a known malicious or compromised host is accessed with some regularity (according to pre-defined criteria) through a certain intermediary host, protective action decision module 608 determines an appropriate response. For instance, the intermediary host can be indicated as a host to be blocked outright or otherwise have access to it restricted.

In various embodiments, the appropriate response is tailored commensurately to an estimated risk corresponding to the intermediary host. For instance, in one approach, the presence of malware on the intermediary host (i.e., the intermediary host is itself a malicious host) results in a stronger response than if the intermediary host simply provides a routing pathway or links to the malicious host. In a related approach, the virulence of the malware accessible via the intermediary host, the strength of the connector to the malicious host from the intermediary host, or a combination of the two is scored by analysis module 214 and used in the estimation of the risk.

Referring again to FIG. 2, in one example of blocking, the IP address of the malicious host or intermediary host to be blocked is placed in the restricted host database 216 (which in this example is a list of blocked sites), which is used to protect users by preventing them from being able to access restricted hosts. In various embodiments restricted host database 216 includes a list of blocked or otherwise restricted hosts and, in embodiments in which there are multiple levels or classes of restriction, the nature of the restriction level or class is also included.

In the embodiment depicted, security configuration module 218 is configured to provide updates to protection mechanism 220 based on restricted host database 216. Examples of protection mechanisms that can constitute protection mechanism 220 include an intrusion prevention system, an object pathway filter, a network address filter, or any combination thereof, residing at a client's computer system or subnet, at a proxy server, or both. In certain implementations, protection mechanism 220 is a module that is licensed by the service provider that operates, controls, or otherwise coordinates the virtual machines 202, analysis module 214, and security configuration module 218. Also, in certain implementations, the protection mechanism is situated in a computer system that is distinct from the analysis module 214.

Each update can include a host restriction set, such as the latest version of restricted host database 216, or some relevant portion thereof. Based on the host restriction set provided, protection mechanism 220 is configured to restrict access to the addresses of hosts contained in the restricted host database according to the restriction level for each restricted host.

In one simple example, the blocking of all addresses in the restricted host database 216 is done using path filtering. The path filter checks the addresses of hosts to which the request is sent over the network or from which a response came, i.e., compares the host address with the data in the restricted host database 216. When a match is made the information exchange between each of the addresses specified in the restricted host database 216 is blocked by protection mechanism 220.

In another embodiment, the host is not blocked entirely, but merely restricted according to a set of at least one rule. In one example, the protection mechanism is configured to permit html content to be received from the restricted host and displayed in the Web browser, but not active content such as Javascript, applets, Flash content, Activex content, or any other code to be executed. Also, file downloads of any sort can be prohibited. Further, the restriction can include editing of the html content of the restricted host such that all links to other hosts and all redirects and pop-ups are removed. Another example of a relatively minor level of restriction is providing a visual or auditory warning to users attempting to access a restricted host, such as, for instance, a dialog box message stating that the host has been identified as having one or more links to a malicious site, and offering to either block the site for the browsing session, or to permit access, to be determined by the user benefiting from the protection mechanism 220. This approach allows users to access desired content on intermediary hosts while reducing the likelihood that the intermediary host will inadvertently lead the user to a malicious site that can infected the user's computer system.

Referring again to FIG. 6, in a related embodiment, the construction of the graph continues with the collection of statistics on the intensity of connection usage based on the information stored by host history module 606. If the result of the collected statistics indicates that the level of intensity of use of a connector for malware distribution falls below a given threshold, the intermediary host through which the malicious software was found is unblocked or its restriction level is reduced by protective action decision module 608. In one embodiment, the statistics taken into consideration for assessing the connector prevalence are chosen on a sliding window basis, thereby limiting the time interval when the communication channel was used to spread malicious software or to access a malicious host.

Separately, or in addition to this review of host usage, one embodiment re-browses the content on the detected malware-containing site to assess whether or not the site continues posing a threat. For example, if the site has remained free of malware for a pre-established time duration, the intermediary host through which the malware was previously spread is unblocked or its restriction level is reduced. In a related embodiment, multiple intermediary hosts are unblocked or de-restricted if the intensity of malware distribution through those blocked intermediary hosts falls below a predetermined threshold, or the accessed site no longer poses a threat.

Figure 4:
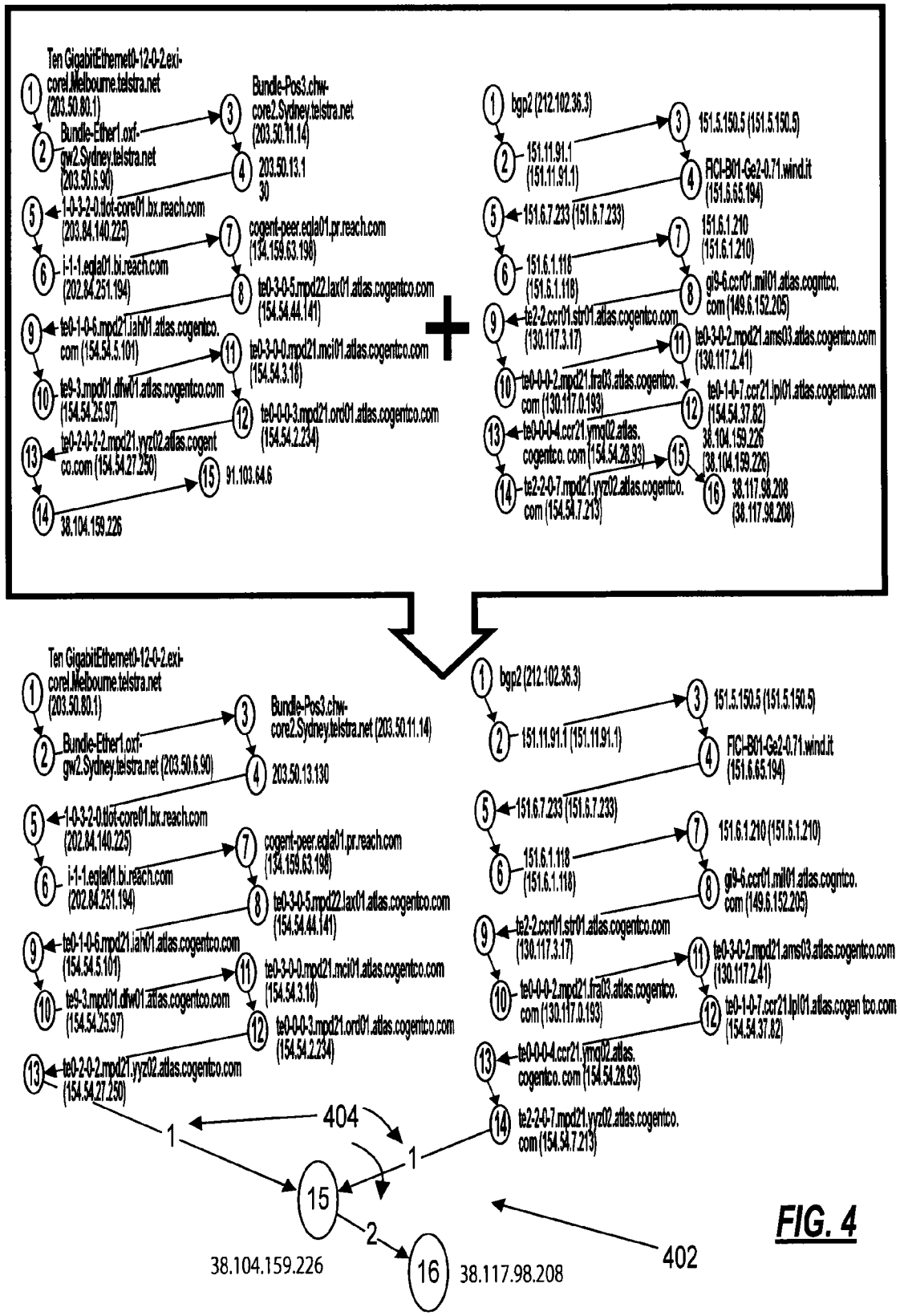
FIG. 4 illustrates an example of combining pathways into graphs in order to analyze the number of detected instances of malicious software being spread.

In a related embodiment, if the bypassing of a number of URL addresses from the restricted host database leads to an infection by malware from a certain malicious website in one or more virtual machines, then all the graphs of hosts, links and automatic re-directs produced by the virtual machines, which contain the one or more malicious or compromised host, are analyzed together. According to one approach, two or more graphs are overlaid and matching hosts and connections (i.e., links and redirects) are identified. Overlaying of graphs can be accomplished algorithmically, with the appropriate overlay computations being used according to the type of data structure used to represent the graphs. FIG. 4 is a diagram graphically illustrating an example of overlaying the pathway graphs of FIGS. 3A and 3B. Common pathways and hosts are combined into a single representation, as indicated at 402. For combined connectors, numerical indicators 404 are introduced to represent the prevalence, (in this case, the quantity) of connectors represented in the combined portions.

If the same intermediary host leads to at least one malicious or compromised host with some degree of regularity that meets or exceeds preset criteria, that intermediary host is blocked. In a related embodiment, the criteria for blocking an intermediary host requires that the intermediary host in question be identified by more than one virtual machine as leading to (i.e., having a connection, link, redirect, etc., to a malicious or compromised host.

In one particular embodiment, the malicious or compromised host to which the intermediary host connects to need not be the same malicious or compromised host at the same IP address or URL, nor does it need to have the same contents. Instead, the intermediary host in question is tested for merely having a connection to a site having malicious content of any sort.

In another related embodiment, the regularity of the connection of an intermediary host in question to a malicious or compromised host is measured in statistical terms. For instance, one set of example criteria requires a minimum number of visits to the intermediary host in question, along with some minimum ratio of those visits that result in infection of a virtual machine by malware. Thus, for example, in order for an intermediary host to be deemed regularly connected to a malicious or compromised host, the intermediary host should have been visited minimum of 10 times (by one or more virtual machines) and, of those at least 10 visits, 90% should have resulted in malware infection of the virtual machine(s) from the connected-to site(s) via that intermediary host. This criteria can be adjusted or redefined according to various embodiments, along with the connection proximity level to any site containing malware. If the criteria is met, the intermediary host is blocked by one or more of the available protection mechanisms.

In a related embodiment, at this stage the construction of the graph continues with the collection of statistics on prevalence of intermediary host usage. If, for example, the result of the collected statistics indicate that the level of intensity of use of a connector for malware distribution falls below a given threshold, or the host previously deemed to be a malicious or compromised host no longer poses a threat, the intermediary host through which the malicious software was spread is then unblocked or its restriction level is reduced. Accordingly, in one embodiment in which blocking is implemented as the restriction, the intermediary host's record in the restricted host database is deleted, and the protection mechanisms will cease preventing access to the network host.

In some cases, the intermediary hosts could be found to be arranged in a chain, sequentially transmitting malware to one another. In this case, according to one embodiment, the intermediary host that is closest to the malicious or compromised host is blocked first. The next closest intermediary host is blocked next, provided that the next intermediary host is also regularly used for accessing malware. Thus, all the intermediary hosts that spread malicious software are recursively blocked.

Figure 9:
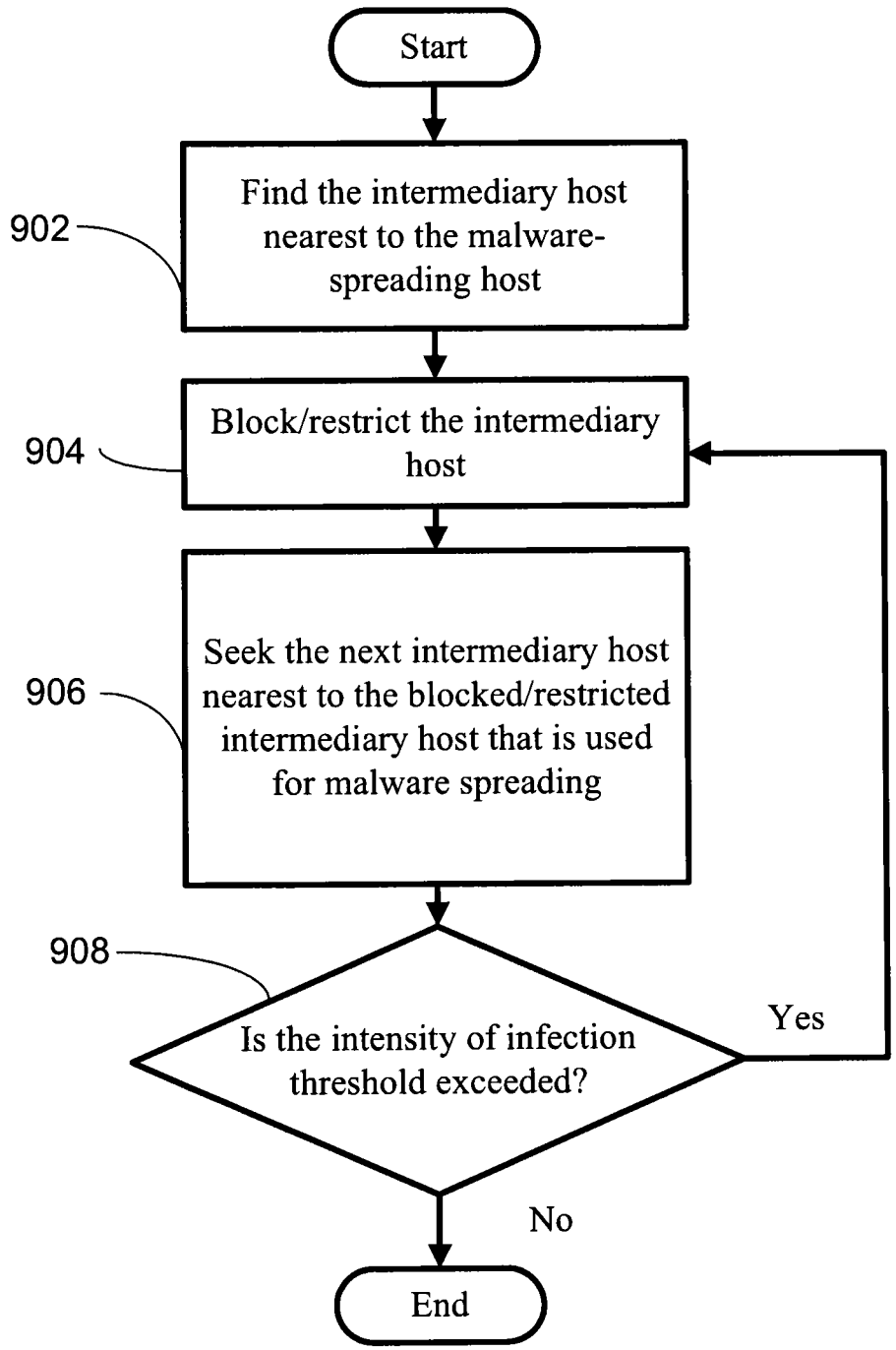
FIG. 9 is a flow diagram illustrating an exemplary process of recursively blocking intermediary hosts according to one embodiment.

FIG. 9 is a flow diagram illustrating an exemplary process of recursively blocking intermediary hosts according to one embodiment. At 902, the intermediary host closest to the malware-spreading host is found in the graph of network traffic pathways. At 904, the intermediary host is blocked (or otherwise restricted). At 906 the next intermediary host which is nearest to the last blocked or restricted intermediary host and which is also used for malware spreading is found. At 908 a decision is made as to whether the intensity of infection spreading exceeds preset criteria such as a threshold. This decision is a measure of the prevalence of the connector between the intermediary host in question and the malware-infected host, a measure of virulence of the malware itself, or a combination of these two parameters. If the criteria is met (i.e., the threshold exceeded) then the intermediary host in question is blocked or restricted. In embodiments with different levels of restriction, there is a more complex set of criteria in the evaluation, the response to which is commensurate with the level of intensity of infection. It is contemplated in various embodiments that weighting schemes or fuzzy logic may be applied to the parameters to arrive at a single measure of malware infection intensity, to which a commensurate restriction is applied. Otherwise, failure to meet the intensity-of-infection criteria is indicative that the intermediary host is not a significant contributor to malware distribution and, as a result, the intermediary host is not blocked or restricted. This recursive approach not only or restricts access to a malware-spreading host, but also creates a ring of protection around the malware-spreading host to prevent the same pathways from being used by criminals or other bad actors to direct users to different, "moving target," malware-spreading sites.

Figure 10:
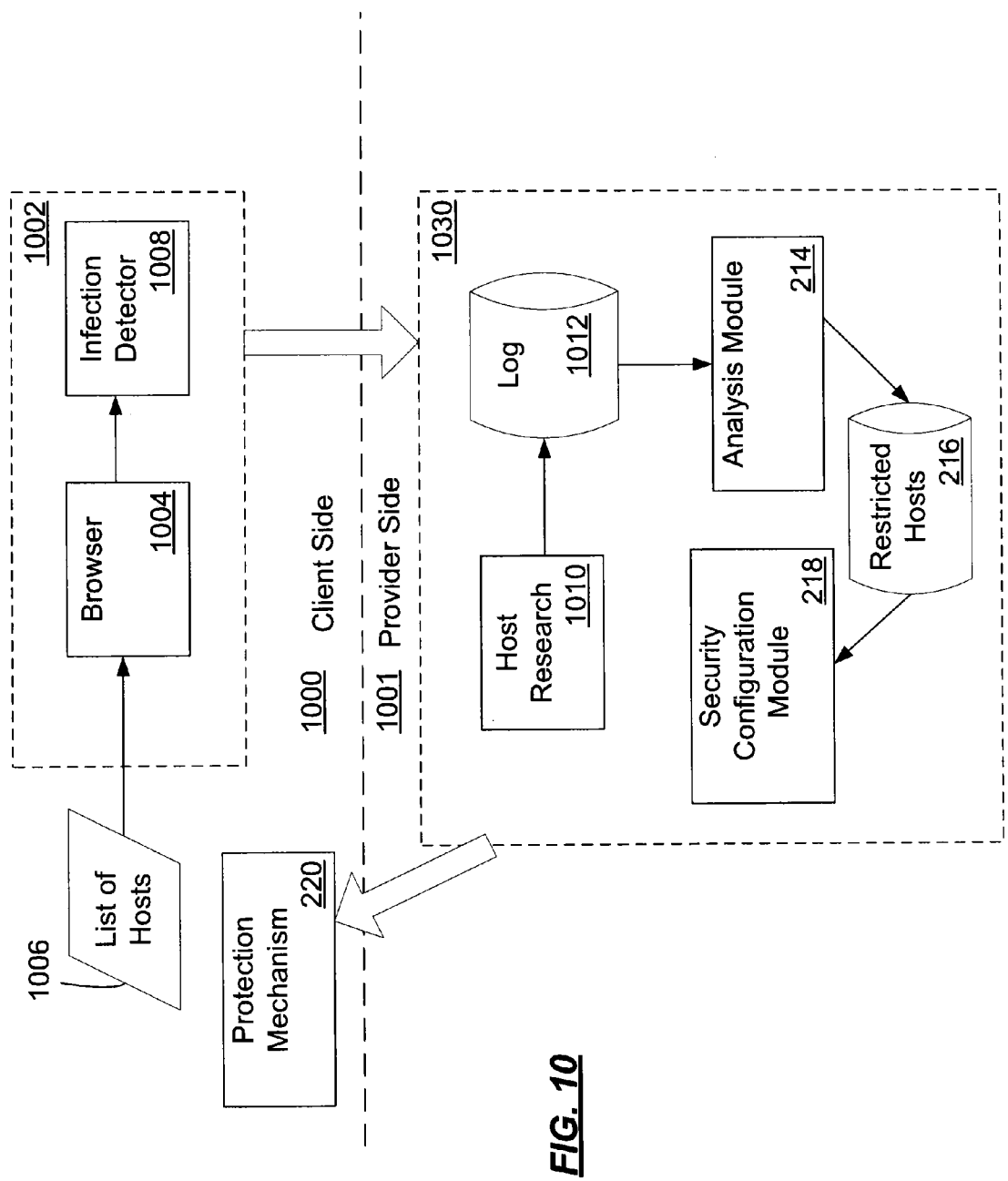
FIG. 10 is a block diagram illustrating an example arrangement of a distributed model utilized in which specialized agents run on participating computer systems or network devices to pre-screen network hosts according to one embodiment of the invention.

Referring now to FIG. 10, in another example arrangement, a distributed model is utilized in which specialized agents run on participating computer systems (or network devices) to pre-screen network hosts. In one such approach, as depicted in FIG. 10, data gathering system 1002 (e.g., one or more virtual machines, each having a browser 1004 and infection detector 1008) is one or more virtual machines implemented on client side 1000 at participating client PCs, or elsewhere in the client side local network, such as at an intrusion prevention system, proxy server, firewall module, or the like. The record of URL exploration results is transmitted by each distributed processing host to a centralized system 1030, which may also be a cloud computing model at service provider side 1001. In forming the record, centralized system 1030 is fed only the data corresponding to malicious pages, e.g., the domain name and IP-address of the host network containing malicious software. The missing information needed for completing the table of exploration of URL results is collected by research host 1010 in the same way as described above. Log 1012 gathers and maintains the records of malicious pages and the intermediary hosts leading to those pages. Analysis module 214, restricted host database 216, and security configuration module 218 operate as described above. Centralized system 1030 configures protection mechanism 220 on the client side to enforce the blocking or restrictions of malicious and intermediary hosts, as determined by analysis module 214.

In one type of embodiment, list of hosts 1006 to be browsed and studied is supplied by centralized system 1030 based on determined information needs. In another type of embodiment, list of hosts 1006 is generated locally, on the client side 1000, based on the types of hosts typically visited by the user on client side 1000. For instance, Web search results generated in response to the user's search queries can be analyzed before the user actually navigates to those sites. In a related embodiment, links and other pages on a given Website being visited by a user are analyzed proactively before the user follows those links. In another related embodiment, to improve performance and minimize delay in the user's browsing experience, the forward-looking links are passed to a cloud computing model for distributed processing analysis.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated computer-implemented method for restricting accessibility to harmful content on a computer network that includes hosts and connectors between the hosts, the method comprising:
exploring, by a system of at least one computer running under program control, network pathways to a plurality of investigated hosts, wherein each investigated host is accessed from a plurality of diverse network connectivity access points into the computer network;
checking, by the system, if any of the investigated hosts are malicious hosts that are believed to contain harmful content;
for any of the investigated hosts that are malicious hosts determined as a result of the checking, identifying, by the system, intermediary hosts having connectors to those malicious hosts based on the exploring of the network pathways; and
associating, by the system, an access restriction with each of the intermediary hosts that restricts access to the corresponding intermediary host.

2. The method of claim 1, wherein exploring the network pathways includes controlling an execution environment selected from a group consisting of: a virtual machine, a sandbox, an execution environment in an internetwork device, or any combination thereof.

3. The method of claim 1, further comprising:
for each of the intermediary hosts, determining a measure of prevalence of its corresponding connectors to at least one of the malicious hosts; and
wherein the associating of the access restriction with each of the intermediary hosts is performed based on the measure of prevalence of the corresponding connectors.

4. The method of claim 3, further comprising:
in response to the measure of prevalence of the corresponding connectors corresponding to a first intermediary host falling below a predefined value, reducing the access restriction associated with the first intermediary host.

5. The method of claim 3, wherein determining the measure of prevalence of the connectors corresponding to each of the malicious hosts includes storing a history record of accessing of each of the malicious hosts via corresponding intermediary hosts and, based on the history record, determining a measure of regularity of use of each connector to that malicious host for accessing that malicious host.

6. The method of claim 1, further comprising:
forming a graph based on results of the exploring of the network pathways, the graph representing topology of explored portions of the computer network, including connectors between the investigated hosts and intermediary hosts situated along explored pathways that include the investigated hosts, an indication of which of the investigated hosts are malicious hosts, and an indication of a prevalence of connectors in pathways corresponding to the malicious hosts.

7. The method of claim 1, further comprising:
for each of the malicious hosts, determining a measure of virulence of the harmful content of that host; and
wherein the associating of the restriction with each of the intermediary hosts having connectors to the at least one of the malicious hosts is performed based on the measure of virulence of the harmful content of the at least one of the malicious hosts.

8. The method of claim 1, wherein the associating of the restriction with each of the intermediary hosts having connectors to the at least one of the malicious hosts includes associating the restriction with at least one intermediary host which does not contain malicious content.

9. The method of claim 1, wherein the exploring of network pathways from a plurality of diverse network entry points includes exploring a plurality of different pathways to a common investigated host.

10. The method of claim 1, further comprising:
providing an update to a protection mechanism that includes a set of the access restrictions associated with each of the intermediary hosts having connectors to the at least one of the malicious hosts, wherein the update permits the protection mechanism to institute restrictions that limit access to each of the intermediary hosts having connectors to the at least one of the malicious hosts.

11. A system for restricting accessibility to harmful content on a computer network that includes hosts and connectors between the hosts, the system comprising:
computing hardware including at least one processor, non-transitory data storage interfaced with the at least one processor, and input/output facilities including network interfacing facilities, the data storage containing instructions that, when executed, establish:
a data gathering system including:
a controllable execution environment module implemented in the computing hardware according to the instructions to explore network pathways to a plurality of investigated hosts, wherein each investigated host is accessed via a plurality of diverse network connectivity access points into the computer network; and
an infection detector module implemented in the computing hardware according to the instructions to check whether each of the investigated hosts is a malicious host believed to contain harmful content;
an analysis module implemented in the computing hardware according to the instructions to identify intermediary hosts having connectors to investigated hosts that are malicious hosts determined by the infection detector module, and to associate an access restriction with each of the intermediary hosts; and
a security configuration module implemented in the computing hardware according to the instructions to provide a host restriction set to a protection mechanism, the host restriction set being based on associations of the intermediary hosts with their corresponding access restrictions, such that the protection mechanism becomes configured to implement the access restrictions to restrict access to at least the intermediary hosts.

12. The system of claim 11, wherein the controllable execution environment module is implemented in at least one virtual machine, in a sandbox on a user's computer system, in an internetwork device, or in any combination thereof.

13. The system of claim 11, wherein the controllable execution environment module includes a plurality of virtual execution environments, each of which is configured to vary its entry point to the network.

14. The system of claim 11, wherein the host restriction set includes restriction information for malicious hosts in addition to restriction information for intermediary hosts.

15. The system of claim 11, wherein the connectors represent two or more relationships between hosts selected from a group consisting of communication channels, links, and redirects.

16. The system of claim 11, wherein the analysis module includes a protective action decision module that tailors the access restriction corresponding to each of the intermediary hosts commensurately with an assessed risk corresponding to that intermediary host.

17. The system of claim 11, wherein the analysis module includes a connector evaluator module configured to determine a prevalence of the connectors based at least in part on a frequency of use of each connector to access a malicious host.

18. The system of claim 11, wherein the analysis module includes a graph generator module configured to form a graph based on results of exploration of the network pathways by the browser module, the graph representing:
    topology of explored portions of the network, including connectors between the investigated hosts and intermediary hosts situated along explored pathways that include the investigated hosts;
    an indication of which of the investigated hosts are malicious hosts; and
    an indication of a prevalence of connectors in pathways corresponding to the malicious hosts.

19. The system of claim 11, wherein at least one of the intermediary hosts with which an access restriction is associated is free of any malicious content.

20. The system of claim 11, wherein the system is arranged as a centralized portion and a distributed portion, wherein the distributed portion includes the data gathering system and the centralized portion includes the analysis module.

21. The system of claim 11, further comprising the protection mechanism, wherein the protection mechanism is a part of a client side computer system or local network device.

22. A computer system configurable to restrict accessibility to harmful content on a computer network that includes hosts and connectors between the hosts, the computer system comprising:
    computing hardware including at least one processor, non-transitory data storage interfaced with the at least one processor, and input/output facilities including network interfacing facilities, the data storage containing instructions that, when executed, establish:
    a protection mechanism module implemented in the computing hardware according to the instructions to institute access restrictions to restrict access by the computer system to certain hosts on the computer network based on a host restriction set, wherein the protection mechanism is further implemented in the computing hardware according to the instructions to receive host restriction set updates from a security configuration provider that generates each host restriction set according to a process that includes:
        exploring network pathways to a plurality of investigated hosts, wherein each investigated host is accessed from a plurality of diverse network connectivity access points into the computer network;
        checking if any of the investigated hosts are malicious hosts believed to contain harmful content;
        for any of the investigated hosts that are malicious hosts determined as a result of the checking, identifying intermediary hosts having connectors to those malicious hosts based on the exploring of the network pathways;
        associating an access restriction with each of the intermediary hosts that restricts access to the corresponding intermediary host; and
        generating the host restriction set based on associations of at least one access restriction with a plurality of intermediary hosts.

23. The method of claim 1, wherein the exploring is performed without human user involvement.

24. The method of claim 1, wherein the exploring is performed such that each investigated host is accessed from a plurality of different entry points into the network.

25. The method of claim 1, wherein associating an access restriction with each of the intermediary hosts includes listing each of the intermediary hosts in a restricted host database.

26. The system of claim 11, wherein the controllable execution environment module is configured to explore the network pathways without human user involvement.

27. The system of claim 11, wherein the controllable execution environment module is configured to access each investigated host from a plurality of different entry points into the network.

28. The system of claim 11, wherein the security configuration module is configured to list each of the intermediary hosts in a restricted host database that, when read by the protection mechanism, causes the protection mechanism to block access to each of the intermediary hosts.

29. An automated computer implemented system for restricting accessibility to harmful content on a computer network that includes hosts and connectors between the hosts, the system comprising:
    means for exploring network pathways to a plurality of investigated hosts, wherein each investigated host is accessed from a plurality of diverse network connectivity access points into the computer network;
    means for checking if any of the investigated hosts are malicious hosts that are believed to contain harmful content;
    means for identifying intermediary hosts having connectors to those malicious hosts based on the exploring of the network pathways for any of the investigated hosts that are malicious hosts determined as a result of the checking; and
    means for associating an access restriction with each of the intermediary hosts that restricts access to the corresponding intermediary host.

30. The method of claim 1, wherein exploring the network pathways to the plurality of investigated hosts from the plurality of diverse network connectivity access points into the computer network includes exploring the network pathways from a plurality of geographically distributed network connectivity entry points into the computer network.

31. The method of claim 1, wherein exploring the network pathways to the plurality of investigated hosts from the plurality of diverse network connectivity access points into the computer network includes connecting to the network via diverse entry points selected from the group consisting of: a plurality of different Internet service providers, a plurality of different subnets of the network, or any combination thereof.

32. The system of claim 11, wherein the controllable execution environment module is further configured to explore the network pathways from a plurality of geographically distributed network connectivity entry points into the computer network.

33. The system of claim 1, wherein the controllable execution environment module is further configured to connect to the network via diverse entry points selected from the group consisting of: a plurality of different Internet service providers, a plurality of different subnets of the network, or any combination thereof.

* * * * *